(12) United States Patent
Lee et al.

(10) Patent No.: US 8,501,037 B2
(45) Date of Patent: Aug. 6, 2013

(54) OPTICALLY ANISOTROPIC COMPOUND AND RESIN COMPOSITION COMPRISING THE SAME

(75) Inventors: Kiyoul Lee, Daejeon (KR); Minjin Ko, Daejeon (KR); Myungsun Moon, Daejeon (KR); Jaeho Cheong, Daejeon (KR); Bumgyu Choi, Seo-gu (KR); Daeho Kang, Daejeon (KR); YunBong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 299 days.

(21) Appl. No.: 12/451,956

(22) PCT Filed: Aug. 19, 2008

(86) PCT No.: PCT/KR2008/004808
§ 371 (c)(1),
(2), (4) Date: Dec. 9, 2009

(87) PCT Pub. No.: WO2009/025484
PCT Pub. Date: Feb. 26, 2009

(65) Prior Publication Data
US 2010/0130659 A1 May 27, 2010

(30) Foreign Application Priority Data
Aug. 23, 2007 (KR) ................ 10-2007-0084944

(51) Int. Cl.
| | | |
|---|---|---|
| G02F 1/13 | (2006.01) | |
| C08K 5/06 | (2006.01) | |
| C08K 5/10 | (2006.01) | |
| C08K 5/36 | (2006.01) | |
| C08K 5/3437 | (2006.01) | |
| C09K 19/12 | (2006.01) | |
| C07C 69/76 | (2006.01) | |
| C07C 273/00 | (2006.01) | |

(52) U.S. Cl.
USPC ............. 252/299.62; 252/299.66; 524/288; 524/292; 524/293; 349/1; 558/411; 560/61

(58) Field of Classification Search
USPC ............ 524/288, 292, 293; 252/299.62, 252/299.66; 349/1; 558/411; 560/61
See application file for complete search history.

(56) References Cited

U.S. PATENT DOCUMENTS

| | | | | |
|---|---|---|---|---|
| 4,762,901 A | * | 8/1988 | Dhein et al. | 528/73 |
| 5,143,986 A | * | 9/1992 | Reuter et al. | 525/437 |
| 5,538,768 A | * | 7/1996 | Marden et al. | 428/1.1 |
| 5,560,864 A | * | 10/1996 | Goulding | 252/299.01 |
| 6,870,163 B1 | * | 3/2005 | Xue et al. | 250/341.1 |
| 2005/0104036 A1 | * | 5/2005 | Tork et al. | 252/299.01 |
| 2008/0174724 A1 | * | 7/2008 | Nakayama et al. | 349/96 |
| 2008/0249665 A1 | * | 10/2008 | Emery et al. | 700/291 |

FOREIGN PATENT DOCUMENTS

| | | | |
|---|---|---|---|
| JP | 02-129211 | | 5/1990 |
| JP | 08-110402 A | | 4/1996 |
| JP | 2000-044614 | | 2/2000 |
| JP | 2004-035347 | | 2/2004 |
| JP | 2006-183005 A | * | 7/2006 |
| JP | 2006183005 | | 7/2006 |

OTHER PUBLICATIONS

Cai, Z. G. et al. "Synthesis and Characterization of a Novel Liquid-Crystalline Epoxy Resin Combining Biphenyl and Aromatic Ester-Type Mesogenic Units"; Journal of Polymer Science; Part A: Polymer Chemistry, Mar. 1, 2007, vol. 45, No. 5, pp. 727-735, ISSN: 0887-624X.

Moore, R.F. et al.; "The retardation of benzaldehyde Autoxidation. Part IV. Isolation of chain-termination products from 3:5:3';5'-tetramethyl-4:4'-diphenoquinone", Journal of the Chemical Society, 1952, p. 2432, ISSN: 0378-1769.

Vizitiu et al. "Ferroelectric Liquid Crystals Induced by Atropisomeric Biphenyl Dopants: Dependence of the Polarization Power on the Nature of the Symmetry-Breaking Groups", Chem Matter. vol. 13 No. 5. 2001. American Chemical Society, pp. 1692-1699.

\* cited by examiner

*Primary Examiner* — Tae H Yoon
(74) *Attorney, Agent, or Firm* — McKenna Long & Aldridge LLP (57) ABSTRACT

Disclosed is a compound having high optical anisotropy and high compatibility with a polymer resin, which is represented by Formula 1 and has at least one substituent introduced to a biphenyl mesogenic core. Also, a resin composition including the compound and a polymer resin, and an optical member including the resin composition are disclosed. In the case of an optical member obtained by using a polymer resin composition including the compound represented by Formula 1, there is no phase separation, and it is possible to achieve a required optical characteristic with only a small amount thereof.

13 Claims, 3 Drawing Sheets

OPTICALLY ANISOTROPIC COMPOUND AND RESIN COMPOSITION COMPRISING THE SAME

This application claims the benefit of PCT/KR2008/004808 filed on Aug. 19, 2008, along with Korean Patent Application No. 10-2007-0084944 filed on Aug. 23, 2007, both of which are hereby incorporated herein by reference for all purposes in their entirety.

TECHNICAL FIELD

The present invention relates to a compound having high compatibility with a polymer resin and high optical anisotropy. Also, the present invention relates to a resin composition including the compound, and an optical member including the resin composition.

BACKGROUND ART

With the recent development of the electronics industry, the use of a polymer resin for optical use has rapidly increased. For example, the demand for various polymer materials for optical use, such as an optical disc substrate used as a storage medium, an optical lens, an optical fiber used for optical communication, a fresnel lens for a projection screen, a prism sheet used in a liquid crystal display, a protective film for a polarizing plate, a compensation film, etc., has been rapidly increased.

Such polymer resins for optical use are usually required to be optically isotropic, but a polymer resin of a final product may be anisotropic due to its own structure or stress during the process. Also, an optical resin, when inserted in a multi-layered structure, may have optical anisotropy by thermal expansion/contraction between respective layers.

When a film, lens, etc. with such optical anisotropy exists in an optical path, a property of the phase may be changed, thereby adversely affecting signal reading. Therefore, it is preferable to use an optical member including an optical resin of which anisotropy is reduced as much as possible.

On the other hand, optical birefringence may be artificially given. For example, in the case of a liquid crystal display, the contrast at an inclined viewing angle may be degraded due to optical birefringence caused by a liquid crystal and a polarizing film. In order to solve this problem, a polymer resin having optical anisotropy with a certain direction may be used to compensate the birefringence caused by the liquid crystal and the polarizing film, thereby improving a viewing angle. In the case of a polymer resin for optical use as mentioned above, the optical characteristic is required to be controlled in a required direction.

As a conventional technology of controlling the optical characteristic of a polymer, a birefringence control method through adjustment of the structure of a polymer resin, such as Japanese Patent Laid-Open Nos. 1990-129211 and 2000-044614, is known. However, the method has a problem in that the composition of a monomer of a copolymer is required to be changed to control the birefringence, and the change in the composition of the monomer may change other physical properties of the polymer resin.

Also, as a birefringence control method of a polymer resin, methods of adding an anisotropic material are known. Japanese Patent Laid-Open No. 2004-035347 disclosed a method of introducing a needle-shaped inorganic particle as an anisotropic material to adjust an optical characteristic. However, in the case of an inorganic fine particle, it is difficult to uniformly disperse the particle in a solvent due to low solubility in the solvent, and high density, and there is a possibility that the particle is subject to aggregation due to low stability, thereby reducing the transparency of the polymer resin. Also, Japanese Patent Laid-Open No. Hei 8-110402 disclosed a method of adjusting the optical characteristic of a polymer resin by adding a low-molecular organic compound. In general, compounds with high anisotropy have disadvantages, such as high crystallinity, low solubility in a solvent, and low compatibility with the polymer resin. Thus, the compounds, when mixed, may be precipitated by crystallization, and may be not dissolved in a solvent. However, there is no specific solution for such problems.

DISCLOSURE

Technical Problem

Therefore, the present invention has been made in view of the above-mentioned problems. The present invention provides a novel compound which has high optical anisotropy, can effectively control the optical characteristic of a polymer resin with only a small amount thereof, and does not cause a problem, such as precipitation, due to high solubility in a solvent and high compatibility with the polymer resin.

Also, the present invention provides a resin composition including the novel compound and the polymer resin, and an optical member including the resin composition.

Technical Solution

In accordance with an aspect of the present invention, there is provided a compound represented by Formula 1:

[Formula 1]

wherein represents represents

Z represents C or N, in which there is no bond with corresponding $R^1$ to $R^8$ provided that Z is N;

each of m and n independently represents an integer of 0 to 2, and m+n is an integer equal to or more than 1;

each of $E^1$ and $E^2$ independently represents —H, —F, —Cl, —Br, —I, —CN, —NCO, —NCS, —CF$_3$, —OCF$_3$, —R$^9$, —OR$^9$, —NHR$^9$, —NR$^9$R$^9$, —SR$^9$, —S(=O)R$^9$, —S(=O)$_2$R$^9$, —C(=O)R$^9$, —C(=O)OR$^9$, —OC(=O)R$^9$, or —OC(=O)OR$^9$;

each of $Y^1$ and $Y^2$ independently represents —O—, —NR$^9$—, —S—, —(CH$_2$)$_p$—, —CH=CH—, —C≡C—, —C(=O)O—, —OC(=O)—, —C(=O)—, —OC(=O)O—, —C(=O)NR$^9$—, —NR$^9$C(=O)—, —NR$^9$C(=O)NR$^9$—, —C(=O)S—, —SC(=O)—, —C(=O)O(CH$_2$)$_p$—, —OC(=O)(CH$_2$)$_p$—, —(CH$_2$)$_p$C(=O)O—, or —(CH$_2$)$_p$OC(=O)—, and p represents an integer of 0 to 5;

each of $R^1$ to $R^8$ and $Q^1$ to $Q^8$ independently represents —H, —F, —Cl, —Br, —I, —CN, —CF$_3$, —OCF$_3$, —R$^9$, —OR$^9$, —NHR$^9$, —NR$^9$R$^9$, or —C(=O)R$^9$, in which at least one of $Q^1$ to $Q^8$ is not —H; and $R^9$ represents —H, C$_1$~C$_{20}$ alkyl, C$_1$~C$_{20}$ fluoroalkyl, C$_2$~C$_{20}$ alkenyl, C$_2$~C$_{20}$ fluoroalkenyl, C$_2$~C$_{20}$ alkynyl, C$_2$~C$_{20}$ fluoroalkynyl, —(CH$_2$CH$_2$O)$_r$CH$_3$, —(CH$_2$CHCH$_3$O)$_r$CH$_3$, or —(CHCH$_3$CH$_2$O)$_r$CH$_3$, and r is an integer of 1 to 5.

In accordance with another aspect of the present invention, there is provided a resin composition including a polymer resin; and the compound represented by Formula 1.

In accordance with a further aspect of the present invention, there is provided an optical member including the resin composition.

Advantageous Effects

A compound represented by Formula 1 of the present invention is an anisotropic compound having high compatibility with a polymer resin and high optical anisotropy. Accordingly, in the case of an optical member obtained by using a resin composition including the compound represented by Formula 1 and a polymer resin, there is no phase separation, and it is possible to achieve a required optical characteristic with only a small amount thereof.

BEST MODE

The compound represented by Formula 1 of the present invention is an optically anisotropic compound having refractive anisotropy of 0.15 or more, and has at least one substituent introduced to a biphenyl mesogenic core.

Specifically, in the compound represented by Formula 1 of the present invention, at least one of $Q^1$ to $Q^8$ of a central biphenyl mesogenic core is a substituent other than a hydrogen atom (—H). In other words, in the compound represented by Formula 1, not all of $Q^1$ to $Q^8$ are hydrogen atoms (—H), and instead, at least one of $Q^1$ to $Q^8$ is selected from the group including —F, —Cl, —Br, —I, —CN, —CF$_3$, —OCF$_3$, —R$^9$, —OR$^9$, —NHR$^9$, —NR$^9$R$^9$ and —C(=O)R$^9$. Also, in the compound represented by Formula 1 of the present invention, preferably, at least two of $Q^1$ to $Q^8$ are substituents other than hydrogen atoms (—H), and more preferably, at least four of $Q^1$ to $Q^8$ are substituents other than hydrogen atoms (—H).

Also, since solubility of the compound by increase of substituted alkyl groups may increase, at least one of $Q^1$ to $Q^8$ is C$_1$~C$_{20}$ alkyl or C$_1$~C$_{20}$ fluoroalkyl. Preferably, at least two of $Q^1$ to $Q^8$ are C$_1$~C$_{20}$ alkyl or C$_1$~C$_{20}$ fluoroalkyl, and more preferably, at least four of $Q^1$ to $Q^8$ are C$_1$~C$_{20}$ alkyl or C$_1$~C$_{20}$ fluoroalkyl.

In the compound represented by Formula 1 of the present invention, examples of C$_1$~C$_{20}$ alkyl of R$^9$ include linear or branched alkyls, such as —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, etc., but the present invention is not limited thereto. Also, fluoroalkyl of R$^9$ may include at least one fluorine group substituting for hydrogen of the alkyl group as defined above.

Also, examples of C$_2$~C$_{20}$ alkenyl of R$^9$ include linear or branched alkenyls, such as —CH=CH$_2$, —CH=CHCH$_3$, —CCH$_3$=CH$_2$, —CH$_2$CH=CH$_2$, —CH=CHCH$_2$CH$_3$, —CH=C(CH$_3$)$_2$, —CCH$_3$=CHCH$_3$, —CH$_2$CH=CHCH$_3$, —CH$_2$CCH$_3$=CH$_2$, —CHCH$_3$CH=CH$_2$, —CH$_2$CH$_2$CH=CH$_2$, etc., but the present invention is not limited thereto. Also, fluoroalkenyl of R$^9$ may include at least one fluorine group substituting for hydrogen of the alkenyl group as defined above.

Also, examples of C$_2$~C$_{20}$ alkynyl of R$^9$ include linear or branched alkynyls, such as —C≡CH, —CH$_2$C≡CH, —C≡CCH$_3$, —CH$_2$CH$_2$C≡CH, —CHCH$_3$C≡CH, —CH$_2$C≡CCH$_3$, —C≡CCH$_2$CH$_3$, etc., but the present invention is not limited thereto. Also, fluoroalkynyl of R$^9$ may include at least one fluorine group substituting for hydrogen of the alkynyl group as defined above.

Also, in the compound represented by Formula 1 of the present invention, in $E^1$ and $E^2$, the alkyl, fluoroalkyl, alkenyl, fluoroalkenyl, alkynyl, and fluoroalkynyl groups of R$^9$ preferably have carbon numbers of 3 to 12 (C$_3$~C$_{12}$). Also, in $E^1$ and $E^2$, the alkyl, fluoroalkyl, alkenyl, fluoroalkenyl, alkynyl, and fluoroalkynyl groups of R$^9$ are preferably branched. Accordingly, more preferably, in $E^1$ and $E^2$, the alkyl, fluoroalkyl, alkenyl, fluoroalkenyl, alkynyl, and fluoroalkynyl groups of R$^9$ are branched with C$_3$~C$_{12}$.

The compound represented by Formula 1 of the present invention is easily mixed with various polymer resins, and has high solubility, even at low temperatures. In addition, the compound is physically and chemically stable under the condition where a liquid crystal display device is usually used, and is stable under heat and light, and has optical anisotropy.

Therefore, the compound represented by Formula 1 may be mixed with various polymer resins to control the optical characteristic of a polymer resin.

Specific examples of the compound represented by Formula 1 are as follows, but the present invention is not limited thereto.

-continued

Hereinafter, the method of preparing the compound represented by Formula 1 will be described. However, the reaction schemes are illustrative only and do not limit the method.

The compound represented by Formula 1 may be prepared by Reaction Scheme 1.

—$NR^9COOH$, —$NR^9H$, —SH, —MgBr, or —Li; and p, $Q^1$ to $Q^8$, $E^1$, $Y^1$, $Y^2$, ring A and m are the same as defined in Formula 1.

Also, the compound represented by Formula 1 may be prepared by Reaction Scheme 2.

[Reaction Scheme 2]

[Reaction Scheme 1]

A symmetrical biphenyl compound may be synthesized by coupling a biphenyl type compound with an $E^1$-[ring A]$_m$—$Z^1$ compound.

In Reaction Scheme 1, each of $X^1$, $X^2$ and $Z^1$ independently a living group, such as halide, mesylate, tosylate, triflate, etc., —OH, —$(CH_2)_pBr$, —$(CH_2)_pCl$, —$(CH_2)_pOH$ —$(CH_2)_p$COCl, —CH=CH—Cl, —C≡CH, —COOH, —COCl, One side of a biphenyl compound is selectively coupled with an $E^1$-[ring A]$_m$—$Z^1$ compound. The intermediate compound is coupled with a $Z^2$-[ring B]$_n$—$E^2$ compound to synthesize an asymmetric biphenyl compound.

In Reaction Scheme 2, each of $X^1$, $X^2$, $Z^1$ and $Z^2$ independently a living group, such as halide, mesylate, tosylate, triflate, etc., —OH, —$(CH_2)_pBr$, —$(CH_2)_pCl$, —$(CH_2)_pOH$ —$(CH_2)_p$COCl, —CH=CH—Cl, —C≡CH, —COOH, —COCl, —$NR^9COOH$, —$NR^9H$, —SH, —MgBr, or —Li; and p, $Q^1$ to $Q^8$, $E^1$, $E^2$, $Y^1$, $Y^2$, ring A, ring B, m and n are the same as defined in Formula 1.

In the method of preparing the compound represented by Formula 1 according to the present invention, any reactant capable of showing the same or similar effects to that of the reactant used in reaction schemes 1 and 2 may be used, and any preparation method having a similar scheme to that of reaction schemes 1 and 2 may be employed.

A resin composition according to the present invention includes a polymer resin and a compound represented by Formula 1 of the present invention. Herein, the compound represented by Formula 1 may play a role of controlling the optical characteristic of the polymer resin.

When used for such purpose, the compound represented by Formula 1 may be used alone or in combination. Also, within the resin composition, the polymer resin and the anisotropic compound represented by Formula 1 may be used in a weight ratio of 50:50 to 99:1, preferably of 70:30 to 99:1, and more preferably of 80:20 to 99:1.

As the polymer resin, which can be mixed with the compound represented by Formula 1, a conventional polymer resin for optical use may be used with no particular limitation. Examples of the polymer resin include polyimide, polyamide imide, polyamide, polyetherimide, polyetheretherketone, polyetherketone, polyketone sulfide, polyethersulfone, cycloolefin polymer, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose, epoxy resin, phenol resin, etc., but the present invention is not limited thereto. Also, the polymer resins may be used alone or in combination, and herein, the use amount is not particularly limited.

Also, the resin composition according to the present invention may include an organic solvent as required, in addition to the polymer resin, and the anisotropic compound. The organic solvent included in the composition facilitates the application (coating) of the resin composition of the present invention on a substrate.

Herein, as the organic solvent, conventional organic solvents known in the art may be used without any particular limitation. Non-limiting examples of the organic solvent include: hydrocarbons such as cyclohexane, cyclopentane, benzene, toluene, xylene, butylbenzene, etc.; ketones such as acetone, methyl ethyl ketone, methyl isobutyl ketone, cyclohexanone, etc.; esters such as ethyl acetate, ethylene glycol monomethyl ether acetate, propylene glycol monomethyl ether acetate, gamma-butyrolactone, etc.; amides such as 2-pyrrolidone, N-methyl-2-pyrrolidone, dimethylformamide, dimethylacetamide, etc.; halogens such as chloroform, dichloromethane, carbon tetrachloride, dichloroethane, tetrachloroethane, tetrachloroethylene, chlorobenzene, etc.; alcohols such as t-butyl alcohol, diacetone alcohol, glycerin, monoacetin, ethylene glycol, triethylene glycol, hexylene glycol, ethylene glycol monomethyl ether, etc.; phenols such as phenol, parachlorophenol, etc.; and ethers such as methoxybenzene, 1,2-dimethoxybenzene, diethylene glycol dimethyl ether, ethylene glycol dimethyl ether, ethylene glycol diethyl ether, propylene glycol dimethyl ether, propylene glycol diethyl ether, diethylene glycol dimethyl ether, diethylene glycol diethyl ether, dipropylene glycol dimethyl ether, dipropylene glycol diethyl ether, etc. Also, the organic solvents may be used alone or in combination, and herein, the use amount is not particularly limited.

Also, the resin composition of the present invention may include a surfactant as required. A surfactant may be used to allow the composition to be easily applied on a substrate. As the surfactant, conventional surfactants known in the art may be used without any particular limitation, and the addition amount may vary according to the kind of surfactant, the composition ratio of components of a mixture, the kind of solvent, and the kind of substrate.

Also, the resin composition of the present invention may include a stress reducing agent, a leveling agent, etc. as an additional additive.

An optical member according to the present invention includes the resin composition of the present invention.

Herein, when a film-type optical member is obtained by using the resin composition of the present invention, the resin solids including the compound represented by Formula 1 are usually included in an amount of 0.1 to 90 wt %, preferably of 1 to 50 wt %, and more preferably of 5 to 40 wt %, based on the total resin composition including a solvent. If the concentration of the resin composition is less than the lower limit, it is difficult to secure the thickness of a film, and if the concentration is greater than the upper limit, it is difficult to obtain a film having a uniform thickness due to high viscosity of a solution.

Also, the film obtained by using the resin composition of the present invention may be a uniaxially oriented film or a biaxially oriented film, and the polymer film may be used after surface treatment such as hydrophilic treatment or hydrophobic treatment, and may be a laminated film or glass.

Also, the film may be made into a transparent film by using the resin composition of the present invention, and a melt-molding method or a solvent cast method, etc. In manufacturing the transparent film by the solvent cast method, the resin composition is applied on a support, such as a metal drum, a still belt, a polyester film, Teflon, etc., a solvent is dried in a drying furnace by using a roller, and then a film is peeled from the support. The amount of residual solvent in the transparent film is usually 10 wt % or less, preferably 5 wt % or less, and more preferably 1 wt % or less. If the amount of residual solvent is greater than the upper limit, the heat resistance of the film shows a tendency to be decreased. The manufactured transparent film may control the optical characteristic of the polymer resin by uniaxial orienting or biaxial orienting.

Reference will now be made in detail to the preferred embodiments of the present invention. However, the following examples are illustrative only, and the scope of the present invention is not limited thereto.

EXAMPLE 1

Synthesis of a Compound

1

1.0 equivalent of 3-hydroxybenzoic acid (compound 1) was dissolved in a mixed solvent of ethanol and water (7:3 v/v), and 1.2 equivalents of 1-bromohexane and 2.2 equivalents of KOH were added, followed by stirring at 90° C. for about 10 hours. Then, ethanol was completely removed by distillation under reduced pressure, and water was additionally added. 10% HCl (aq) was gradually added thereto to adjust pH to 1 to 3 and then to precipitate solids. The resultant solution was filtered to obtain a compound 2 at a yield of 80% or more. 2.0 equivalents of compound 2 and 1.0 equivalent of compound 3 were dissolved in $CH_2Cl_2$. Then, 2.6 equivalents of EDC and 0.2 equivalents of DMAP were added thereto, and stirred at room temperature for about 10 hours. After the completion of the reaction, the mixture was worked up with $CH_2Cl_2$ and recrystallized by methanol to obtain a final compound 4 at a yield of 85% or more. $^1$HNMR of the compound 4 is as follows.

$^1$HNMR (400 MHz, $CDCl_3$): δ 0.91~0.97 (m, 6H), 1.37 (m, 8H), 1.52 (m, 4H), 1.84 (m, 4H), 2.20 (s, 12H), 4.06 (t, 4H), 7.16 (d, 2H), 7.26 (s, 4H), 7.40 (t, 2H), 7.67 (s, 2H), 7.81 (d, 2H).

EXAMPLE 2

Synthesis of a Compound

-continued

9

1.0 equivalent of 3-hydroxybenzoic acid (compound 1) was dissolved in methanol, and a small amount of concentrated sulfuric acid was added thereto, followed by stirring for 10 hours. Then, methanol was completely removed by distillation under reduced pressure, and water was additionally added. Saturated $NaHCO_3$ (aq) was added thereto, and the resultant mixture was worked up with ethyl acetate, and recrystallized by hexane to obtain methyl ester of a compound 5 at a yield of 91% or more. Then, 1.0 equivalent of compound 5 was dissolved in DMF solvent, and 1.2 equivalents of 2-ethylhexyl-1-bromide (compound 6) and 1.5 equivalents of $K_2CO_3$ were added thereto, followed by stirring at 90° C. for about 10 hours. After the completion of the reaction, the mixture was worked up with ether and water and purified via silica gel to obtain a compound 7 at a yield of about 87%. 1.0 equivalent of compound 7 was dissolved in a mixed solvent of methanol and water (1:1 v/v), and 2.0 equivalents of NaOH was added, followed by stirring at 90 ° C. for about 10 hours. After the completion of the reaction, the mixture was worked up with ether and water to obtain a compound 8 at a yield of about 95%. 2.0 equivalents of benzoic acid compound 8 and 1.0 equivalent of compound 3 were dissolved in $CH_2Cl_2$, Then, 1.2 equivalents of EDC and 0.1 equivalents of DMAP were added thereto, and stirred at room temperature for about 10 hours. After the completion of the reaction, the mixture was worked up with $CH_2Cl_2$, purified via silica gel, and recrystallized by methanol to obtain a final compound 9 at a yield of 85% or more. $^1$HNMR of the compound 9 is as follows.

$^1$HNMR (400 MHz, $CDCl_3$): δ 0.80~0.95 (m, 12H) , 1.25 (m, 8H), 1.38~1.55 (m, 8H), 1.70 (m, 2H), 2.21 (s, 12H), 3.90 (t, 4H), 7.16 (d, 2H), 7.26 (s, 4H), 7.40 (t, 2H), 7.67 (s, 2H), 7.81 (d, 2H).

EXAMPLE 3

Synthesis of a Compound

14

A final compound 14 was synthesized in the same manner as described in Example 2, except that 4-hydroxybenzoic acid (compound 10), instead of 3-hydroxybenzoic acid (compound 1), was used as a starting material. $^1$HNMR of the compound 14 is as follows.

$^1$HNMR (400 MHz, CDCl$_3$): δ 0.90~1.00 (m, 12H), 1.37 (m, 8H), 1.42~1.58 (m, 8H), 1.79 (m, 2H), 2.23 (s, 12H), 3.95 (t, 4H), 7.02 (d, 4H), 7.33 (s, 4H), 8.21 (d, 4H).

EXAMPLE 4

Synthesis of a Compound

19

A final compound 19 was synthesized in the same manner as described in Example 2, except that 3-hydroxy-5-methyl-benzoic acid (compound 15), instead of 3-hydroxybenzoic acid (compound 1), was used as a starting material. $^1$HNMR of the compound 19 is as follows.

$^1$HNMR (400 MHz, CDCl$_3$): δ 0.90~1.00 (m, 12H), 1.38 (m, 8H), 1.40~1.60 (m, 8H), 1.80 (m, 2H), 2.28 (s, 12H), 2.36 (s, 6H), 3.99 (t, 4H), 7.30 (m, 2H), 7.35 (s, 5H), 7.65 (s, 2H), 7.80 (d, 2H).

EXAMPLE 5

Synthesis of a Compound

24

A final compound 24 was synthesized in the same manner as described in Example 2, except that 3,5-dihydroxybenzoic acid (compound 20), instead of 3-hydroxybenzoic acid (compound 1), was used as a starting material. $^1$HNMR of the compound 24 is as follows.

$^1$HNMR (400 MHz, CDCl$_3$): δ 0.89~1.00 (m, 24H), 1.30~1.40 (m, 16H), 1.40~1.60 (m, 16H), 1.78 (m, 4H), 2.25 (s, 12H), 3.95 (t, 8H), 6.78 (s, 2H), 7.35 (s, 4H), 7.40 (s, 4H).

EXAMPLE 6

Synthesis of a Compound 2.0 equivalents of compound 25 and 1.0 equivalent of compound 3 were dissolved in CH$_2$Cl$_2$, and 2.6 equivalents of EDC and 0.2 equivalents of DMAP were added, followed by stirring at room temperature for about 10 hours. After the completion of the reaction, the mixture was worked up with CH$_2$Cl$_2$, and recrystallized by methanol to synthesize a final compound 26 at a yield of 80% or more. $^1$HNMR of the compound 26 is as follows.

$^1$HNMR (400 MHz, CDCl$_3$): δ 2.20 (s, 12H), 7.26 (s, 4H), 7.66 (m, 4H), 8.30 (m, 4H).

EXAMPLE 7

Figure 1:
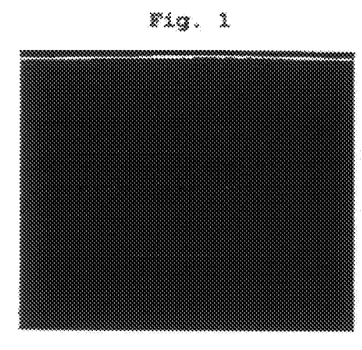
FIGS. 1 to 5 are photographs showing the results of the compatibility tests according to Examples 7 to 11, respectively.

Compatibility Test 90 parts by weight of general-purpose acrylate polymer resin (Mw=100,000), and 10 parts by weight of the compound 4 synthesized in Example 1 were dissolved in 400 parts by weight of ethyl acetate (concentration=20 wt %), and the resultant solution was applied on glass and baked at 110° C. for 3 minutes. After storage of the resultant product at room temperature for 24 hours, whether solid was precipitated on the surface or not was observed. FIG. 1 shows the result. According to the compatibility test result, an anisotropic compound was not precipitated, even after 24 hours.

EXAMPLE 8

Compatibility Test

Figure 2:
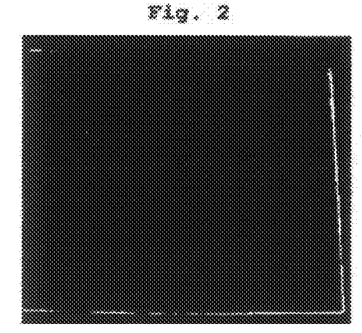

A compatibility test was carried out in the same manner as described in Example 7, except that the compound 9 synthesized in Example 2, instead of the compound 4 synthesized in Example 1, was used in an amount of 10 parts by weight. FIG. 2 shows the result. According to the compatibility test result, an anisotropic compound was not precipitated, even after 24 hours.

EXAMPLE 9

Compatibility Test

Figure 3:
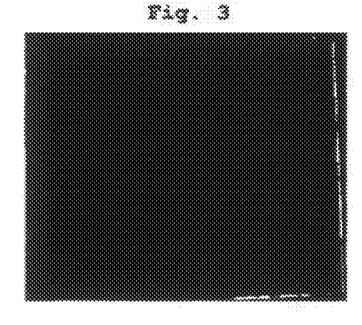

A compatibility test was carried out in the same manner as described in Example 7, except that the compound 14 synthesized in Example 3, instead of the compound 4 synthesized in Example 1, was used in an amount of 10 parts by weight. FIG. 3 shows the result. According to the compatibility test result, an anisotropic compound was not precipitated, even after 24 hours.

EXAMPLE 10

Compatibility Test

Figure 4:
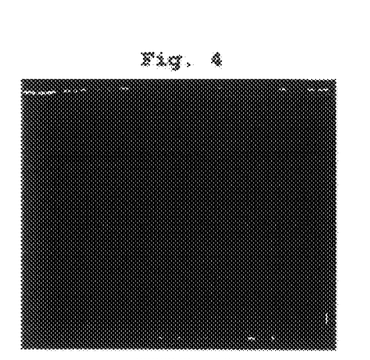

A compatibility test was carried out in the same manner as described in Example 7, except that the compound 19 synthesized in Example 4, instead of the compound 4 synthesized in Example 1, was used in an amount of 10 parts by weight. FIG. 4 shows the result. According to the compatibility test result, an anisotropic compound was not precipitated, even after 24 hours.

EXAMPLE 11

Compatibility Test

Figure 5:
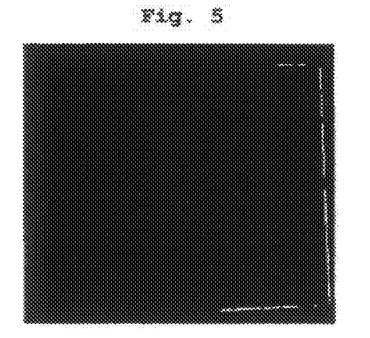

A compatibility test was carried out in the same manner as described in Example 7, except that the compound 24 synthesized in Example 5, instead of the compound 4 synthesized in Example 1, was used in an amount of 10 parts by weight. FIG. 5 shows the result. According to the compatibility test result, an anisotropic compound was not precipitated, even after 24 hours.

COMPARATIVE EXAMPLE 1

Compatibility Test

28

Figure 6:
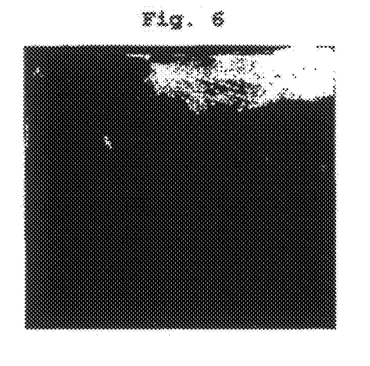
FIGS. 6 and 7 are photographs showing the results of the compatibility tests according to Comparative Examples 1 and 2, respectively.

A compatibility test was carried out, in the same manner as described in Example 7, except that instead of the compound 4 synthesized in Example 1, a compound 28 synthesized by a similar reaction to Example 1 was used in an amount of 10 parts by weight. FIG. 6 shows the result. According to the compatibility test result, after the manufacture of a film, precipitation of the compound 28 on the surface of the film was observed at room temperature.

COMPARATIVE EXAMPLE 2

Compatibility Test

29

Figure 7:
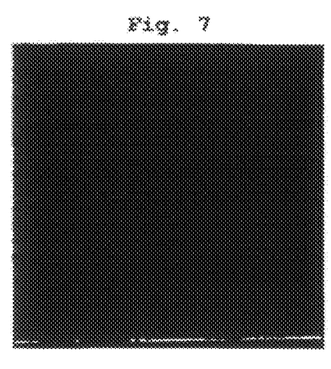

A compatibility test was carried out in the same manner as described in Example 7, except that instead of the compound 4 synthesized in Example 1, a compound 29 synthesized by a similar reaction to Example 2 was used in an amount of 10 parts by weight. FIG. 7 shows the result. According to the compatibility test result, after the manufacture of a film, precipitation of the compound 29 on the surface of the film was observed at room temperature.

It can be seen from the above experimental results that, compared to a compound where a substituent was not introduced to a biphenyl mesogenic core (in other words, all of $Q^1$ to $Q^8$ are hydrogen atoms), the compound according to the present invention which has at least one substituent introduced to a biphenyl mesogenic core (in other words, at least one of $Q^1$ to $Q^8$ is a substituent other than a hydrogen atom (—H)) shows high compatibility with a polymer resin, and especially, shows higher compatibility in the case where a branched substituent is introduced to both terminal ends of the mesogenic core.

The invention claimed is:

1. A compound represented by the following Formula 1:

[Formula 1]

wherein represents represents

Z represents C or N, in which there is no bond with corresponding $R^1$ to $R^8$ provided that Z is N;
m is 2, and n represents an integer of 1 to 2;

each of $E^1$ and $E^2$ independently represents —F, —Cl, —Br, —I, —CN, —NCS, —CF$_3$, —OCF$_3$, —S(=O)R$^9$, —S(=O)$_2$R$^9$, —C(=O)R$^9$, —C(=O)OR$^9$ —C(=O)OR$^9$, or —OC(=O)R$^9$;

each of $Y^1$ and $Y^2$ independently represents —O—,

—S—, —(CH$_2$)$_p$—, —CH=CH—, —C(=O)O—, —OC(=O)—, —C(=O)—,

—C(=O)S—, —SC(=O)—, —C(=O)O(CH$_2$)$_p$—, —OC(=O)(CH$_2$)$_p$—, —(CH$_2$)$_p$C(=O)O—, or —(CH$_2$)$_p$OC(=O)—, and p represents an integer of 0 to 5;

each of $R^1$ to $R^8$ and $Q^1$ to $Q^8$ independently represents —H, —F, —Cl, —Br, —I, —CN, —CF$_3$, —OCF$_3$, —R$^9$, —OR$^9$, or —C(=O)R$^9$, in which at least one of $Q^1$ to $Q^8$ is not —H; and $R^9$ represents —H, C$_1$~C$_{20}$ alkyl, C$_1$~C$_{20}$ fluoroalkyl, C$_2$~C$_{20}$ alkenyl, C$_2$~C$_{20}$ fluoroalkenyl, C$_2$~C$_{20}$ alkynyl, C$_2$~C$_{20}$ fluoroalkynyl, —(CH$_2$CH$_2$O)$_r$CH$_3$, —(CH$_2$CHCH$_3$O)$_r$CH$_3$, or —(CHCH$_3$CH$_2$O)$_r$CH$_3$, and r is an integer of 1 to 5.

2. The compound claimed as in claim 1, wherein at least two of $Q^1$ to $Q^8$ are C$_1$~C$_{20}$ alkyl or C$_1$~C$_{20}$ fluoroalkyl.

3. The compound as claimed in claim 1, wherein at least one of $E^1$ and $E^2$ independently represents —S(=O)R$^9$, —S(=O)$_2$R$^9$, —C(=O)R$^9$, —C(=O)OR$^9$, or —OC(=O)R$^9$; and R$^9$ represents C3~C12 alkyl, C3~C12 fluoroalkyl, C3~C12 alkenyl, C3~C12 fluoroalkenyl, C3~C12 alkynyl, or C3~C12 fluoroalkynyl.

4. The compound as claimed in claim 1, wherein at least one of $E^1$ and $E^2$ independently represents —S(=O)R$^9$, —S(=O)$_2$R$^9$, —C(=O)R$^9$, —C(=O)OR$^9$, or —OC(=O)R$^9$; and R$^9$ represents branched C2~C20 alkyl, branched C2~C20 fluoroalkyl, branched C2~C20 alkenyl, branched C2~C20 fluoroalkenyl, branched C2~C20 alkynyl, or branched C2~C20 fluoroalkynyl.

5. The compound as claimed in claim 1, wherein refractive anisotropy is 0.15 or more.

6. A resin composition comprising a polymer resin; and the compound represented by the following Formula 1:

[Formula 1]

wherein represents represents

Z represents C or N, in which there is no bond with corresponding $R^1$ to $R^8$ provided that Z is N;

m is 2, and n represents an integer of 1 to 2;

each of $E^1$ and $E^2$ independently represents —F, —Cl, —Br, —I, —CN, —NCS, —CF$_3$, —OCF$_3$, —S(=O)R$^9$, —S(=O)$_2$R$^9$, —OC(=O)R$^9$, —C(=O)OR$^9$, or —OC(=O)R$^9$;

each of $Y^1$ and $Y^2$ independently represents —O—,

—C(=O)S—, —SC(=O)—, —C(=O)O(CH$_2$)$_p$—, —OC(=O)(CH$_2$)$_p$—, —(CH$_2$)$_p$C(=O)O—, or —(CH$_2$)$_p$OC(=O)—, and p represents an integer of 0 to 5;

each of $R^1$ to $R^8$ and $Q^1$ to $Q^8$ independently represents —H, —F, —Cl, —Br, —I, —CN, —CF$_3$, —OCF$_3$, —R$^9$, —OR$^9$, or —C(=O)R$^9$, in which at least one of $Q^1$ to $Q^8$ is not —H; and $R^9$ represents —H, C$_1$~C$_{20}$ alkyl, C$_1$~C$_{20}$ fluoroalkyl, C$_2$~C$_{20}$ alkenyl, C$_2$~C$_{20}$ fluoroalkenyl, C$_2$~C$_{20}$ alkynyl, C$_2$~C$_{20}$ fluoroalkynyl, —(CH$_2$CH$_2$O)$_r$CH$_3$, —(CH$_2$CHCH$_3$O)$_r$CH$_3$, or —(CHCH$_3$CH$_2$O)$_r$CH$_3$, and r is an integer of 1 to 5.

7. The resin composition as claimed in claim 6, wherein at least two of $Q^1$ to $Q^8$ are C$_1$~C$_{20}$ fluoroalkyl.

8. The resin composition as claimed in claim 6, wherein at least one of $E^1$ and $E^2$ independently represents —S(=O)R$^9$, —S(=O)$_2$R$^9$, —C(=O)R$^9$, —C(=O)OR$^9$, or —OC(=O)R$^9$; and R$^9$ represents C3~C12 alkyl, C3~C12 fluoroalkyl, C3~C12 alkenyl, C3~C12 fluoroalkenyl, C3~C12 alkynyl, or C3~C12 fluoroalkynyl.

9. The resin composition as claimed in claim 6, wherein at least one of $E^1$ and $E^2$ independently represents —S(=O)R$^9$, —S(=O)$_2$R$^9$, —C(=O)R$^9$, —C(=O)OR$^9$, or —OC(=O)R$^9$; and R$^9$ represents branched C2~C20 alkyl, branched C2~C20 fluoroalkyl, branched C2~C20 alkenyl, branched C2~C20 fluoroalkenyl, branched C2~C20 alkynyl, or branched C2~C20 fluoroalkynyl.

10. The resin composition as claimed in claim 6, wherein refractive anisotropy of the compound represented by Formula 1 is 0.15 or more.

11. The resin composition as claimed in claim 6, wherein weight ratio of the polymer resin:the compound represented by Formula 1 is 50:50 to 99:1.

12. An optical member comprising the resin composition as claimed in claim 6.

13. The optical member as claimed in claim 12, wherein weight ratio of the polymer resin:the compound represented by Formula 1 is 50:50 to 99:1.

* * * * *